United States Patent [19]

Freund

[11] 4,142,156

[45] Feb. 27, 1979

[54] CONTROL SIGNAL APPARATUS FOR CATV SYSTEM

[75] Inventor: Robert W. Freund, Flushing, N.Y.

[73] Assignee: Veripen, Inc., New York, N.Y.

[21] Appl. No.: 753,838

[22] Filed: Dec. 23, 1976

[51] Int. Cl.² .......................... H04H 1/02; H04N 7/10
[52] U.S. Cl. ....................................... 325/309; 325/31; 328/73; 358/84
[58] Field of Search .................. 325/31, 37, 53–55, 325/58, 64, 308, 309, 325, 30; 328/48, 120, 138, 72, 73; 307/269; 340/168 R, 168 B, 171 A, 167 R, 151; 310 A; 358/84, 86

[56] References Cited

U.S. PATENT DOCUMENTS

| 3,130,265 | 4/1964 | Leonard | 358/84 |
| 3,614,619 | 10/1971 | Huntsinger | 328/138 |
| 3,757,035 | 9/1973 | Sullivan | 358/84 |
| 3,803,491 | 4/1974 | Osborn | 325/53 |
| 3,836,858 | 9/1974 | Kitano | 328/48 |
| 3,859,596 | 1/1975 | Jannery et al. | 325/53 |
| 3,866,175 | 2/1975 | Seifert, Jr. et al. | 340/151 |
| 4,012,734 | 3/1977 | Jagoda et al. | 340/151 |

Primary Examiner—Robert L. Griffin
Assistant Examiner—Jin F. Ng
Attorney, Agent, or Firm—Hane, Roberts, Spiecens & Cohen

[57] ABSTRACT

In a cable or CATV system consisting of a central station with a television transmitter connected via a television transmission cable to a plurality of remote stations each with a television receiver, there is provided apparatus for signalling between the central and remote stations. The apparatus includes at the central station pulse generating means for transmitting via the cable variable sets of packets of first frequency signals followed by a packet of second frequency signal. Each of the remote stations is assigned a specific set of the first frequency signals. In each remote station the packets of first frequency signals are converted to a set of first pulses and the packet of second frequency signal to a second pulse. Counting means count the first pulses of the set and if the count at the time the second pulse is received agrees with a count assigned to the remote station an indication is given.

6 Claims, 4 Drawing Figures

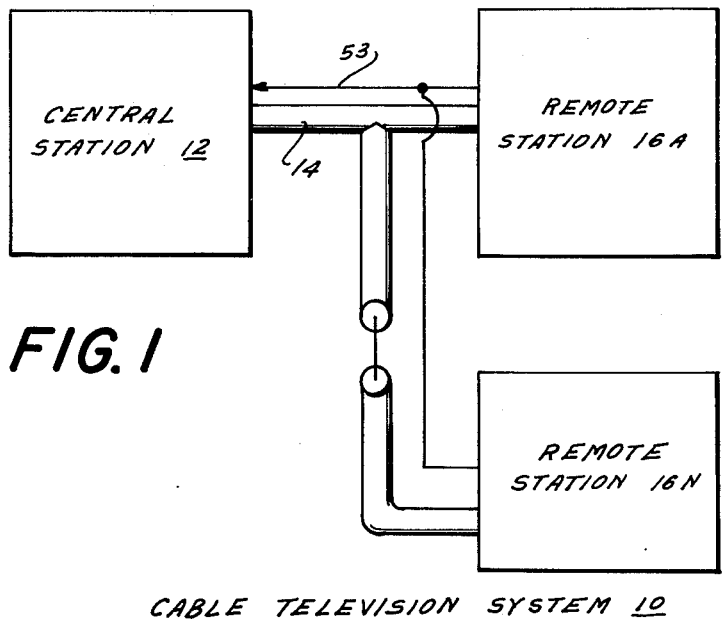
FIG. 1
CABLE TELEVISION SYSTEM 10
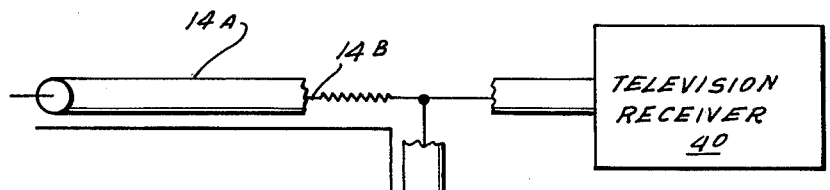
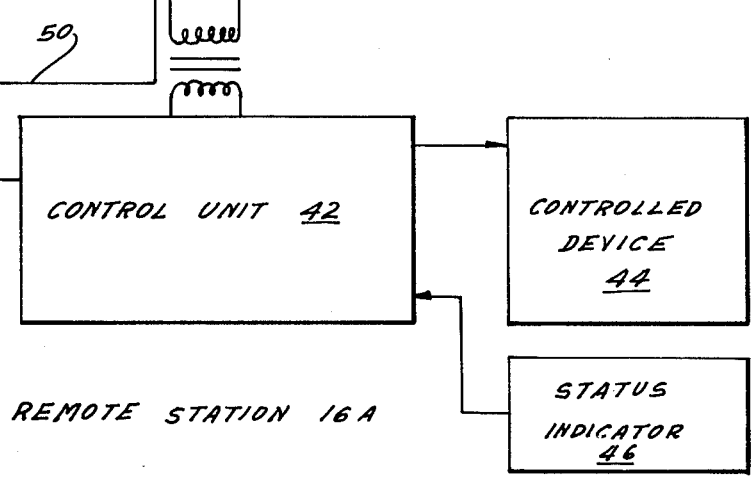
FIG. 3
REMOTE STATION 16A

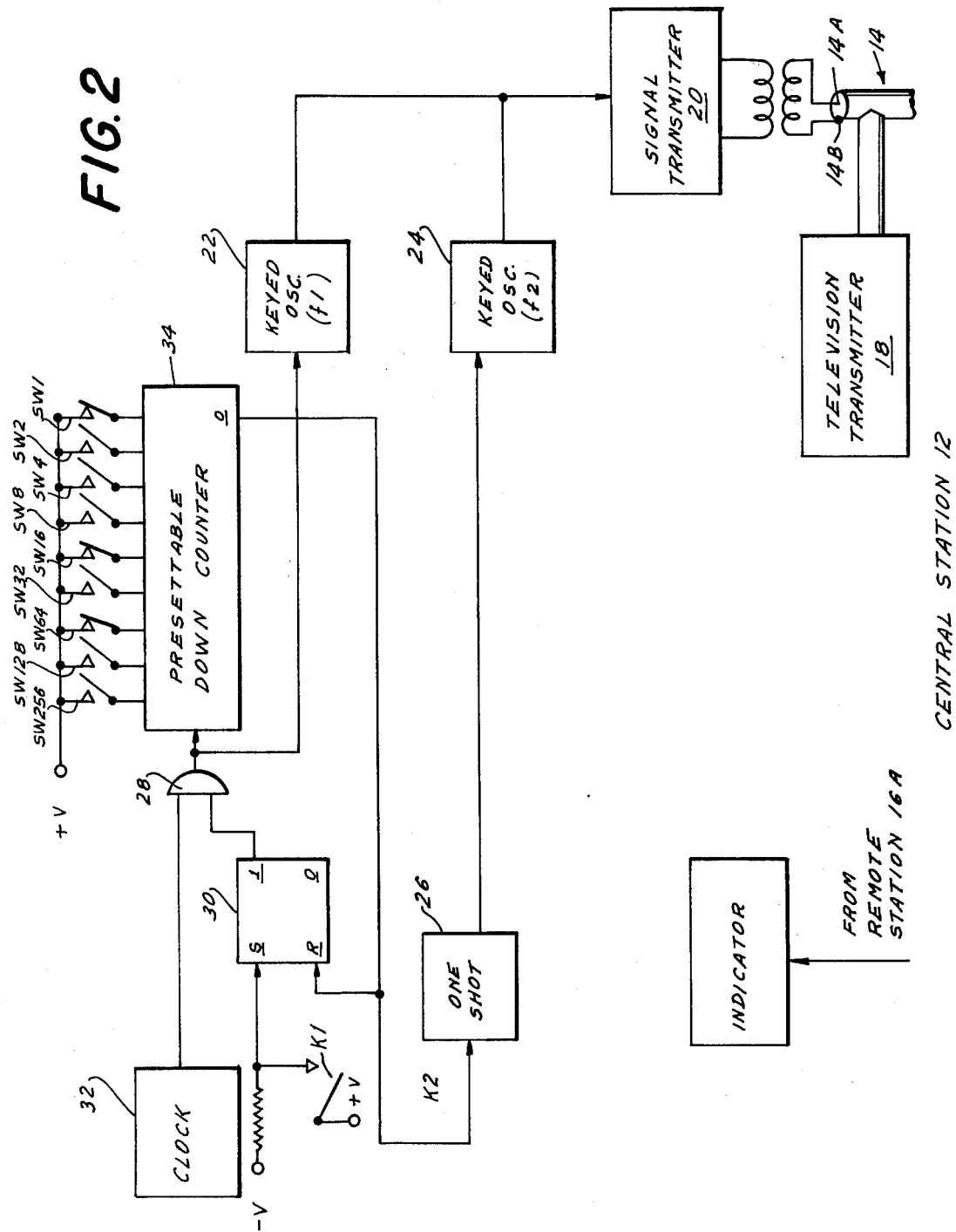

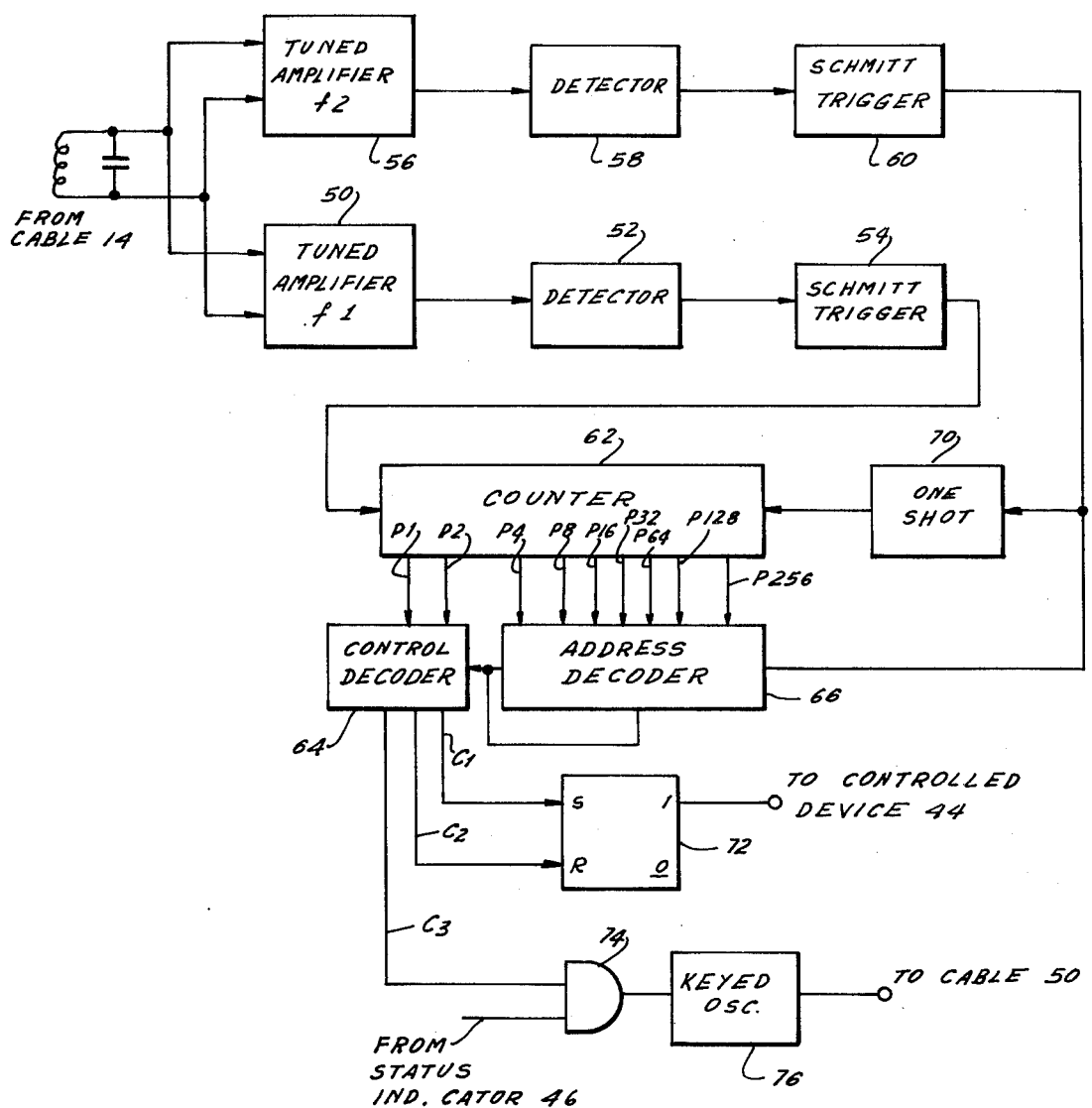

CONTROL SIGNAL APPARATUS FOR CATV SYSTEM

BACKGROUND OF THE INVENTION

This invention pertains to signalling systems and more particularly to signalling systems for use in existing cable television systems.

Signalling systems between a central station and a plurality of remote stations have many applications. For example, in hotels and motels it is often necessary to turn off power consuming devices such as air conditioners when the room is vacant and not rely on the occupant to do so upon leaving the room. It can be used in hospitals for nurse calling or even in apartment buildings for signalling between a doorman and the tenants. Most systems require a complete wiring to set up the system. Such wiring is usually expensive. In buildings supplied with cable television, this wiring generally runs in parallel with the television cable.

SUMMARY OF THE INVENTION

It is an object of the invention to provide improved apparatus for signalling between a central and a plurality of remote stations by utilizing a preexisting television transmission cable which interconnects the stations.

Briefly, the invention contemplates a cable television system having a central station with a television transmitter connected via a television transmission cable to a plurality of remote stations with television receivers wherein there is provided apparatus for transmitting signals other than television signals between the central station and the remote stations. The apparatus includes at the central station generating means for generating a controllably variable set of first pulses followed by a second pulse which are transmitted onto the television transmission cable. At each of the remote stations the received pulses are decoded by decoding means for determining whether the set of first pulses corresponds to the configuration of a set of first pulses assigned to the particular remote station, and means interrogate the decoding means in response to the receipt of the second pulse to give an indication.

BRIEF DESCRIPTION OF THE DRAWING

Other objects, the features and advantages of the invention will be apparent from the following detailed description when read with the accompanying drawing which shows by way of example and not limitation apparatus for practicing the invention.

In the drawing:

FIG. 1 is a block diagram of a cable television system utilizing the invention;

FIG. 2 is a block diagram of the central station of the system of FIG. 1;

FIG. 3 is a block diagram of a remote station of the system of FIG. 1; and

FIG. 4 is a block diagram of the control unit in the remote station of FIG. 3.

DESCRIPTION OF THE PREFERRED EMBODIMENT

In FIG. 1 there is shown a cable television system 10 including a central station 12 connected via coaxial cable (television transmission cable) 14 to a plurality of remote stations 16A to 16N. In a motel, for example, the central station can be in the office and the remote stations in the guest rooms. The central station 12 includes a television transmitter and each of the remote stations 16 includes a television receiver so that conventional television programming is sent to all rooms of the motel. Such a system is common and well known in the art. Superimposed on this system and utilizing the cable 14 is the signalling apparatus of the invention.

More specifically, the central station 12 includes means for generating variable sets of first pulses followed by a second pulse. The first and second pulses which are preferably packets or bursts of first and second frequency signals are fed via cable 14 to each of the remote stations 16A to 16N. Although the sets can be of various forms such as a coded series of pulse-no pulse combinations, it is advantageous to use sets of different numbers of pulses. In such case each remote station is assigned a unique address which is a given number of first pulses. For example, remote station 16A can be assigned the number twenty and remote station 16N the number forty. Thus when central station 12 wishes to signal remote station 16A it emits a set of twenty packets of the first frequency signal followed by one packet of the second frequency signal. The first and second frequency signals have typical frequencies of 23 and 23.2 MHz and do not affect the conventional television signal. In a preferred embodiment of the invention the set of packets of first frequency signals is divided into two parts, a first part includes the address of the desired remote station and the second control information to be sent to that station. For example, assume the control information is represented by from zero to three pulses or packets permitting four combinations or four different control functions. Now the set must be modified. The first part of the set must be a number of pulses or packets equal to four times the original address number i.e., for the present example, there will be eighty pulses for the address of station 16A. Thus to signal remote station 16A, the central station 12 will emit eighty packets of first frequency signal followed by from zero to three packets of the first frequency signal followed by one packet of second frequency signal.

Within each of the remote stations 16 is means for receiving and converting each packet of first frequency signal into a first pulse and the second packet into a second pulse. Also within each of the remote stations 16 is decoding means in the form of a pulse counter and decoder for counting the first pulses and giving an indication when the count of the first portion of the set equals the address number assigned to the associated remote station. For example, for the case where the address number of the remote station 16A is twenty and the number of address pulses is 80 = 4 × 20, the decoding means of remote station 16A will give an indication only when it receives from 80 to 83 first pulses. Also in the remote station and actually part of the counting means is means for indicating whether 0, 1, 2 or 3 first pulses in addition to the 80 first pulses are received. This second portion of the set is decoded to form one of four unique control signals. Within the remote station are means for utilizing the control signals. For example, a control signal can be used to energize a solenoid to turn off an air-conditioner which a departing guest left on. Another control signal can be used to interrogate the status of call button or the like.

To insure that only the desired station is signalled, there is included in each remote station means for utilizing the second pulse to, first, interrogate whether the decoder has decoded the count associated with the station; and, then, to clear the counting means back to a home state preparatory to another signalling.

The central station 12 will now be described with reference to FIG. 2. The central station 12 includes the conventional television transmitter 18 coupled to cable 14 for transmitting television programs to the remote stations. In addition, a signal transmitter 20, a conventional broadband frequency amplifier, is transformer coupled across the central conductor 14A and outer conductor 14B of cable 14. The input to the transmitter 20 is coupled to the outputs of keyed oscillators 22 and 24. The oscillator 22 only when receiving a high signal at its input emits the first frequency signal (a continuous AC signal having the desired first frequency f1). Similarly the oscillator 24 only when receiving a high signal at its input emits the second frequency signal (a continuous AC signal having the desired second frequency f2).

The input of the oscillator 24 is connected to the output of one-shot multivibrator 26. One-shot multivibrator 26 is of conventional design whose output is low until its input receives a positive going transient. Then the output of the multivibrator goes high for a predetermined period of time before returning to a low condition. Thus, whenever multivibrator 26 is triggered, it emits a positive pulse of given duration.

The input of oscillator 22 is connected to the output of the conventional two-input AND-circuit 28 whose first input is connected to clock 32 and whose second input is connected to the 1-output of conventional set-reset flip-flop 30. Clock 32 is a conventional free-running pulse generator which emits pulses having durations equal to the duration of the pulse from multivibrator 26.

The set-reset flip-flop is triggered by positive going pulses at its set and reset inputs S and R, respectively. The set input is connected to switch K1.

The output of AND-circuit 28 is also connected to the count input of conventional down counter 34 which can be preset by means of switches SWN to a given initial count from which it unit decrements for each pulse received from AND-circuit 28 until the count is zero at which time it emits a pulse from its output O. Output O is connected to the R-input of flip-flop 30 and the input of multivibrator 26.

In operation, and assuming the above example, the counter 34 is set to a count of eighty one (eighty for the address of remote station 16A and one for a control signal) by momentarily closing the indicated switches SW1, SW16, and SW64. The switch K1 is momentarily closed setting flip-flop 30 whose 1-output goes high. Thus clock pulses from clock 32 start unit decrementing the count in the counter and at the same time pulse keyed oscillator 22 which in response thereto sends packets of first frequency signal via transmitter 20 onto cable 14. When after eighty one pulses the counter has counted down to zero its output O goes high resetting flip-flop 30 and blocking AND-circuit 28. Thus no more pulses go to keyed oscillator 22. In addition the positive going transient from the output O of counter 34 triggers multivibrator 26 which emits a single pulse to keyed oscillator 24 which transmits one packet of second frequency signal via transmitter 20 to cable 14. Whenever another remote station is to be signalled the switches SWN are momentarily set to the desired count and then switch K1 is momentarily closed. It should be noted that while the switches are shown as mechanical switches, in practice electronic circuitry and switches would be used. In fact the switches SWN and K1 would be part of a scanner which permits automatic sequential scanning of the remote stations.

A typical remote station 16A will be described with reference to FIG. 3. In FIG. 3 the remote station is shown consisting of a conventional television receiver 40 and a control unit connected to cable 14, and a controlled device 44 and a status indicator connected to control unit 42. When control unit 42 receives the proper number of packets via cable 14 from central station 12, it emits a control signal to controlled device 44 which can be, for example, the solenoid controlling power to an air-conditioner or it tests the state of status indicator 46 which can be a call button and transmits a signal denoting that status via line 50 to central station 12.

The control unit 42 is shown in greater detail in FIG. 4. In effect, two parallel channels one for the first frequency and the other for the second frequency are transformer coupled to cable 14. The first channel consists of amplifier 50 tuned to the first frequency f1 which passes packets of signal of only that frequency to conventional peak detector 52 where the packets are detected to form the envelopes of the packet which are then shaped into a first pulses by conventional Schmitt trigger 54. The second channel is identical, only amplifier 56 is tuned to the second frequency f2 so Schmitt trigger 60 will emit the second pulse.

The set of first pulses from Schmitt trigger 54 is fed to the count input of conventional up counter 62. The two least significant outputs P1 and P2 of the counter 62 are connected to inputs of control decoder 64 while the remaining outputs P4, P8, P16, P32, P64, etc. are connected to inputs of address decoder 66. Control decoder 64 can be a conventional binary-to-decimal type decoder wherein only the two least significant binary inputs and the four least significant decimal outputs are used and wherein the strobe or sampling input is connected to the output of address decoder 66. Address decoder 66 can be a conventional AND-circuit having direct and inverting inputs. For the example given, i.e., an address number of eighty the inverting inputs of the circuit are connected to outputs P4, P8, P32, P128 and P256 of the counter 62, and the direct inputs of the circuit are connected to outputs P16 and P64 of counter 62 and the output of Schmitt trigger 60 acting as a decoder activating or strobe source. Note since the address decoder 66 does not sample the two least significant positions of the counter it will give an output for any count from eighty to eighty three. Thus, the four different possibilities permit the transmission of four different control functions in the same set.

The clear input CL of the counter 62 is connected to the output of one-shot multivibrator 70 whose input is connected to the output of Schmitt trigger 60. Multivibrator 70 is of conventional design and emits a pulse when triggered by a negative going step such as the trailing edge of a positive pulse. The outputs C1 and C2 of control decoder 64 are connected to the S- and R- inputs, respectively of set-reset flip-flop 72 whose 1-output is connected to control device 44. The output C3 is connected to one-input of two-input AND-circuit 74 whose other input is connected to status indicator 46. The output of AND-circuit 74 is connected to keyed oscillator 76 (tuned to a frequency f3) whose output is connected to cable 50.

In operation and assuming the counter has been cleared to zero (initialized), the set of packets of the first frequency signal is converted in the first channel to the set of first pulses which are counted in counter 62. At the end of the set the packet of the second frequency signal is received and converted to the second pulse which is fed to address decoder 66. If the count of the first set is between eighty and eighty three, address decoder 66 sends a strobe pulse to control decoder 64. Assuming the example given, i.e., the count is eighty one this control decoder 64 would emit a pulse on line C1 which would set the flip-flop 72 which sends a control signal to the controlled device 44. If the count had been, say, eighty-three, then control decoder. 64 would emit a signal on line C3 alerting AND-circuit 74. If at that time status indicator 46 is in a call position keyed oscillator 76 would emit a burst of third frequency signal via cable 50 to the central station 12.

At the end of the second pulse the counter 62 is cleared to its initialized state by a signal from multivibrator 70 which is triggered by the trailing edge of such pulse.

While only a single embodiment of the invention has been shown and described in detail there will now be obvious to those skilled in the art many modifications and variations satisfying many or all of the objects of the invention but which do not depart from the spirit thereof as defined by the appended claims.

What is claimed is:

1. In a cable television system having a central station with a television transmitter and a plurality of remote stations connected thereto via a television transmission cable, said remote stations having television receivers, apparatus for transmitting signals other than television signals between the central station and the remote stations comprising: at the central station, generating means for generating a controllably variable set of first pulses followed by a second pulse, said controllably variable set of first pulses including a first variable number of the first pulses and representing the address of a remote station and a second variable number of the first pulses and representing data for said remote station and transmitting means for transmitting said pulses onto the television transmission cable; and, at each of said remote stations, receiving means for receiving said pulses, and decoding means, said decoding means including counting means for counting the number of received first pulses and sensing means connected to said counting means and response to the receipt of said second pulse for giving an address indication only when the first number of pulses represents the address of the particulate remote station, and indicating means responsive to the receipt of an address indication from said sensing means for giving data indication representing the second number of said first pulses, wherein said counting means comprises a binary pulse counter for counting the received first pulses and a count decoder for giving a first indication only when a predetermined count is accumulated by said binary pulse counter during the reception of said second pulse.

2. The apparatus defined in claim 1, wherein said transmitting means transmits each of said first pulses as a packet of a first frequency signal and said second pulse as a packet of a second frequency signal, and said receiving means includes means for converting each packet of said first frequency signal to a pulse for transmission to said decoding means, and means for converting the packet of said second frequency signal to a pulse for transmission to said sensing means.

3. The apparatus of claim 1 further comprising a controlled device and control means for controlling the state of operation of said controlled device in accordance with indications received from said sensing means.

4. The apparatus of claim 1 further comprising a status indicator means for transmitting a status indication to said central station, said sensing means activating said status indicator means.

5. The apparatus of claim 1 further comprising means for clearing said binary pulse counter to an initial count by utilizing the trailing edge of said second pulse.

6. A control signal generator comprising first means for converting packets of first frequency signals to first pulses, second means for converting packets of second frequency signals to second pulses, a multiposition pulse counting means connected to said first means for accumulating counts of the first pulses, count decoder means connected to the more-significant positions of said pulse counting means and sampled by said second pulses for emitting an indication only when a predetermined count is accumulated by said pulse counting means, signal generating means connected to the lesser-significant positions of said pulse counting means and to said count decoder means for generating a control signal determined by the binary state of at least one of said lesser significant positions when said count decoder means is emitting an indication during the occurrence of one of the second pulses, and means responsive to the trailing edge of said second pulse for clearing the count accumulated by said pulse counting means.

* * * * *